United States Patent Office 2,912,341
Patented Nov. 10, 1959

2,912,341

CASTABLE REFRACTORY

Richard W. Ricker, New Kensington, Pa., assignor to Aluminum Company of America, Pittsburgh, Pa., a corporation of Pennsylvania No Drawing. Application December 21, 1954
Serial No. 476,837

7 Claims. (Cl. 106—64)

This invention relates to refractory concrete in which calcium aluminate cement serves as a binder.

Concretes composed of calcium aluminate cement and a refractory aggregate as the primary components are used for various purposes in which the concrete is subjected to high temperatures. Such concretes are called castable refractories, or "castables," in the industry. They are used, for example, in making cast walls, linings, roofs, and hearths of industrial furnaces, and as linings for ladles for molten metal. They generally contain 10 to 40% by weight of calcium aluminate cement, and an aggregate. Frequently a small proportion of clay or other material is added to aid in water retention and act as a plasticizer.

When structures made of such concretes are heated at sufficiently high temperatures, such as above 2000° F., the calcium aluminate cement forms a ceramic bond which imparts high strength to the concrete. However, at elevated temperatures somewhat lower than those at which the ceramic bond is formed, combined water is driven off from the hydrated calcium aluminate which provides the hydraulic bond of the concrete, thereby weakening the concrete structure. That problem of loss of strength at intermediate temperatures, and various proposals to overcome it, are discussed in an article entitled "Investigation of Certain Properties of Refractory Concrete," by R. A. Giles, in The Bulletin of The American Ceramic Society, vol. 18, No. 9, pp. 326–332 (1939).

Many attempts have been made to improve the strength of castables in the intermediate temperature range by means of various additives. A large number of low-melting materials have been suggested, such as low-melting glass or enamel frit, clays which vitrify at low temperature, and sodium silicate. However, such low-melting materials decrease the refractoriness of the castable, and lower the maximum temperature at which the castable can be used effectively. Topaz and other fluorine-bearing materials have also been proposed for improving the strength of castables in the intermediate temperature zone, but topaz is not available commercially, and most fluorides are sufficiently water-soluble to affect the hydraulic set of calcium aluminate cements. If the mixing water in the concrete mix becomes alkaline, too rapid setting is promoted, and if the water becomes acidic, the setting is delayed.

It is the object of this invention to provide a castable refractory mix comprising calcium aluminate cement and having improved strength at elevated temperatures below those at which the cement normally forms a ceramic bond.

In accordance with this invention one or more alkaline earth metal carbonates (barium carbonate, magnesium carbonate, strontium carbonate, and calcium carbonate) are included in castable refractories comprising calcium aluminate cement and an aggregate, the amount of alkaline earth metal carbonate being equal to 0.25 to 2.25%— and preferably 0.5 to 1.5%—of the weight of the calcium aluminate cement. The alkaline earth metal carbonate may be provided in the form of naturally occurring minerals, such as magnesite, limestone, and dolomite, or in the form of compounds of commercial chemical purity. From the standpoint of uniformity of results, barium carbonate and dolomite are the preferred additives.

The presence of the alkaline earth metal carbonate in the castable results in a substantial improvement in the strength at temperatures at which combined water is normally driven off from hydrated calcium aluminate. Moreover, at such temperatures the strength of castables containing the alkaline earth metal carbonate addition is more uniform and consistent than in the case of castables of otherwise corresponding composition. The alkaline earth metal carbonate does not adversely affect the refractoriness or softening point of the castable, its hydraulic set, or other properties. Apparently the carbonate catalyzes formation of a ceramic bond by the cement, causing that bond to develop at a lower temperature than is otherwise the case.

In castables formulated in accordance with this invention, the refractory aggregates customarily employed in castables can be used; for example: calcined fire clay, chrome ore, highly calcined alumina, kyanite, olivine, crushed fire clay, and vermiculite. It is preferred to use dense, hard aggregates of high melting point, such as highly calcined alumina or bauxite, calcined clay, or chrome ore. A small proportion of clay may be added to the castable to aid in water retention and improve workability. A preferred castable which embodies my invention consists of, by weight, 36% of calcium aluminate cement, 63% of highly calcined alumina aggregate, 0.5% of clay, and 0.5% of dolomite.

The improvement in strength resulting from the inclusion of an alkaline earth metal carbonate in a castable refractory mix is illustrated in the examples set forth below.

*Example I*

Three refractory mixes of the composition described below were tested in accordance with the method described on pages 54–56 of "Manual of A.S.T.M. Standards on Refractory Materials," published by the American Society For Testing Materials (February 1952), except that the cast specimens were heated at about 1700° F. for 16 hours, instead of as called for in that publication. Mix No. 1 contained 2600 parts by weight of a commercial calcium aluminate cement made by sintering a mixture of limestone and bauxite and 4600 parts by weight of highly calcined alumina of minus 8 mesh size particles as an aggregate. Mix No. 2 was the same as Mix No. 1, except that it had 20 parts by weight of dolomite mixed thoroughly therewith. Mix No. 3 was also the same as Mix No. 1, except that it contained 40 parts by weight of dolomite. After the above-mentioned heating step, the modulus of rupture of the cast specimens made of Mixes Nos. 2 and 3 were 7% and 17%, respectively, higher than that of the specimen made of Mix No. 1.

*Example II*

Four refractory mixes described below were tested in the same manner as described in Example I. Mix No. 1 contained 2600 parts by weight of calcium aluminate cement made by sintering a mixture of limestone and commercial alumina, and 4600 parts by weight of highly calcined alumina of minus 8 mesh size as an aggregate. Mixes Nos. 2, 3, and 4 were the same as Mix No. 1, except that they also contained, respectively, 10, 20, and 30 parts by weight of barium carbonate. After the cast specimens had been heated at 1700° F. for 16 hours, the modulus of rupture of the specimens made of Mixes Nos. 2, 3, and 4 were 22%, 45% and 42%, higher, respectively, than that of the specimen made of Mix No. 1.

Example III

Three mixes described below were tested as described in Example I. Mix No. 1 contained 2600 parts by weight of calcium aluminate cement made by sintering a mixture of limestone and commercial alumina, and 4600 parts by weight of chrome ore. Mixes Nos. 2 and 3 were the same, except that they also contained 20 parts by weight of magnesium carbonate, and 40 parts by weight of dolomite, respectively. After the cast specimens had been heated at 1700° F. for 16 hours, the modulus of rupture of the specimens made of Mixes Nos. 2 and 3 were 5% and 11% higher, respectively, than that of the specimen made with Mix No. 1.

I claim:

1. A castable refractory mix comprising as the essential components thereof calcium aluminate cement, a refractory aggregate, and at least one alkaline earth metal carbonate, the alkaline earth metal carbonate content of the said mix being equal to from 0.25 to 2.25% of the calcium aluminate cement content by weight.

2. A castable refractory mix in accordance with claim 1, in which the said carbonate is barium carbonate.

3. A castable refractory mix in accordance with claim 1, in which the said carbonate is calcium carbonate.

4. A castable refractory mix in accordance with claim 1, in which the said carbonate is strontium carbonate.

5. A castable refractory mix in accordance with claim 1, in which the said carbonate is magnesium carbonate.

6. A castable refractory mix comprising as the essential components thereof calcium aluminate cement, a refractory aggregate, and dolomite, the dolomite content of the said mix being equal to from 0.25 to 2.25% of the calcium aluminate cement content by weight.

7. A castable refractory mix comprising as the essential components thereof 10–40% by weight of calcium aluminate cement, a refractory aggregate, and at least one alkaline earth metal carbonate, the alkaline earth metal carbonate content of the said mix being equal to from 0.25 to 2.25% of the calcium aluminate cement content by weight.

References Cited in the file of this patent
UNITED STATES PATENTS

| | | |
|---|---|---|
| 2,051,003 | Knote | Aug. 11, 1936 |
| 2,407,135 | Clark | Sept. 3, 1946 |
| 2,469,081 | Ruedi | May 3, 1949 |

OTHER REFERENCES

Eckel: Cements, Limes and Plasters, Wiley & Sons, New York, 1928 (page 655 relied on).